(12) United States Patent
Yang et al.

(10) Patent No.: US 8,281,453 B2
(45) Date of Patent: Oct. 9, 2012

(54) FIXING BASE FOR A WINDSHIELD WIPER

(76) Inventors: Chih-Ming Yang, Taipei (TW);
Chuan-Chih Chang, Taipei (TW)

( * ) Notice: Subject to any disclaimer, the term of this patent is extended or adjusted under 35 U.S.C. 154(b) by 0 days.

(21) Appl. No.: 13/025,238

(22) Filed: Feb. 11, 2011

(65) Prior Publication Data

US 2012/0079669 A1    Apr. 5, 2012

(30) Foreign Application Priority Data

Sep. 30, 2010   (TW) ............................... 99218855 U

(51) Int. Cl.
*B60S 1/40*        (2006.01)
(52) U.S. Cl. ................... 15/250.32; 15/250.43
(58) Field of Classification Search ............... 15/250.43, 15/250.44, 250.361, 250.201, 250.32
See application file for complete search history.

(56) References Cited

U.S. PATENT DOCUMENTS 7,523,522 B2 * 4/2009 Herring et al. ............. 15/250.32
2007/0234501 A1 * 10/2007 Ho et al. .................... 15/250.32
2008/0115308 A1 * 5/2008 Lee ............................. 15/250.32
2009/0113653 A1 * 5/2009 Thienard .................... 15/250.32

FOREIGN PATENT DOCUMENTS

TW           M315183 U        7/2007
* cited by examiner

*Primary Examiner* — Gary Graham
(74) *Attorney, Agent, or Firm* — Chun-Ming Shih; HDLS IPR Services

(57) ABSTRACT

A fixing base (1) for a windshield wiper (100) includes a connecting piece (110) and a wiper blade (120). The fixing base (1) includes a bottom plate (10) and two wings (20). Both sides of the bottom plate (10) abutting the wiper blade (120) form a hook (11) respectively to be engaged with the wiper blade (120). The wings (20) extend from both sides of the bottom plate (10) and each has a first chamfer piece (22), a second chamfer piece (23), a first notch (24) and a second notch (25). The shaft rod (21) is provided between the first notch (24) and the second notch (25). The first notch (24) and the second notch (25) provide a space adjacent to the shaft rod (21) for allowing various kinds of the connecting pieces (110) to be assembled with the fixing base (1).

4 Claims, 7 Drawing Sheets

# FIXING BASE FOR A WINDSHIELD WIPER

BACKGROUND OF THE INVENTION

1. Field of the Invention

The present invention relates to a fixing base for a windshield wiper, and in particular to a fixing base for a windshield wiper, which allows various kinds of connecting pieces to be assembled therewith.

2. Description of Prior Art

Automobile has become a popular public transportation because it can keep out wind and rain as compared to bicycles and motorcycles. Front and rear windshields of the automobile are provided with a wiper respectively for wiping off rain and dirt attached thereon, thereby protecting a person who is driving the automobile.

The conventional windshield wiper includes a connecting piece, a fixing base and a wiper blade. The wiping blade is fixed to the bottom surface of the fixing base and attached to the windshield. The connecting piece is mounted to the top surface of the fixing base. The connecting piece is mounted to a wiper arm of the automobile, so that the wiper arm can drive the windshield wiper to swing on the windshield to thus wipe off the rain or dirt attached thereon.

There are many kinds of automobiles, each having a dedicated wiper arm on its windshield. Of course, each kind of wiper arm can be only assembled with its dedicated connecting piece. As a result, the fixing base and the wiper blade of the windshield wiper have to be designed exclusively to fit the respective kinds of automobiles. Thus, a user has to buy a specific windshield wiper to fit his/her automobile. On the other hand, it is necessary for the manufacturer to produce various kinds of windshield wipers including their accessories such as the connecting piece, the fixing base and the wiper blade. Thus, the molds and apparatuses for manufacturing various kinds of windshield wipers are inevitably increased.

Taking the practical operation and repair of the windshield wiper into consideration, among the accessories of the windshield wiper, the wiper blade suffers damage most frequently because it is made of a flexible material (such as plastic or rubber) and may be worn easily after a long period of time. Since the wiper blade is flexible, the wiper blade may be applicable to several kinds of automobiles within its range of elastic deformation. Thus, the fixing base of the windshield wiper on which the wiper blade is fixed becomes the most important component to determine whether the windshield wiper can be used in other kinds of automobiles.

However, the conventional fixing base for a windshield wiper has a complicated structure. For example, Taiwan Patent No. M506365 discloses a connecting assembly for a windshield wiper. The front and rear ends of the fixing base extend to form a supporting rod respectively for connecting to a wiper blade, which is complicated in structure. Further, Taiwan Patent No. 305183 discloses a connecting assembly for a boneless windshield wiper having a fixing base constituted of several components, which is more expensive and may suffer damage easily.

Therefore, it is an important issue for the present Inventor to solve the above-mentioned problems.

SUMMARY OF THE INVENTION

The present invention is to provide a fixing base for a windshield wiper, which allows various kinds of connecting pieces to be assembled therewith and has a simple structure for easy production.

The present invention is to provide a fixing base for a windshield wiper, the windshield wiper comprising a connecting piece and a wiper blade, the fixing base including:

a bottom plate abutting a top surface of the wiper blade, both longitudinal sides of the bottom plate being bent to form two hooks respectively, the hooks being engaged with two lateral edges of the wiper blade; and two wings extending from two longitudinal sides of the bottom plate and separated from each other, a shaft rod being provided between the two wings for allowing the connecting piece to be pivotally connected thereto, each of the wings being formed with a first chamfer piece and a second chamfer piece, a first notch being provided between the first chamfer piece and the shaft rod, a second notch being provided between the second chamfer piece and the shaft rod, the shaft rod being provided between the first notch and the second notch;

wherein the first chamfer piece and the second chamfer piece are configured to gradually narrow toward both longitudinal ends of the fixing base, the first notch and the second notch provide a space adjacent to the shaft rod for allowing various kinds of the connecting pieces to be assembled with the fixing base.

In comparison with prior art, the present invention has the following advantageous features.

Since the fixing base is constituted of the bottom plate and two wings extending upwardly from both sides of the bottom plate, the fixing base is one-piece and is not constituted of plural components. Thus, the fixing base of the present invention has a simple structure for easy production.

The length, width and pitch of the bottom plate and the two wings are made based on the dimensions of the existing kinds of connecting pieces. The first chamfer piece and the second chamfer piece are configured to gradually narrow towards two longitudinal ends of the fixing base. Further, the first notch and the second notch provide a space adjacent to the shaft rod for allowing various kinds of the connecting pieces to be assembled with the fixing base. The connecting piece can swing around the shaft rod and along the first chamfer piece and the second chamfer piece in the longitudinal direction of the fixing base without any mounting interference.

Since the fixing base of the present invention allows different kinds of connecting pieces of the windshield wiper to be assembled therewith and has a simple structure for easy production, the manufacturer in this field only needs to manufacture one kind of fixing base which is applicable to various kinds of automobiles, the cost of molds and apparatuses for manufacturing the windshield wiper is decreased, and the manufacturing procedure is simplified. Further, the repairer and seller in this field need not to store various kinds of fixing bases. The repair of the windshield wiper becomes more convenient and cheaper.

DETAILED DESCRIPTION OF THE INVENTION

The detailed description and technical contents of the present invention will become apparent with the following detailed description accompanied with related drawings. It is noteworthy to point out that the drawings is provided for the illustration purpose only, but not intended for limiting the scope of the present invention.

Figure 1:
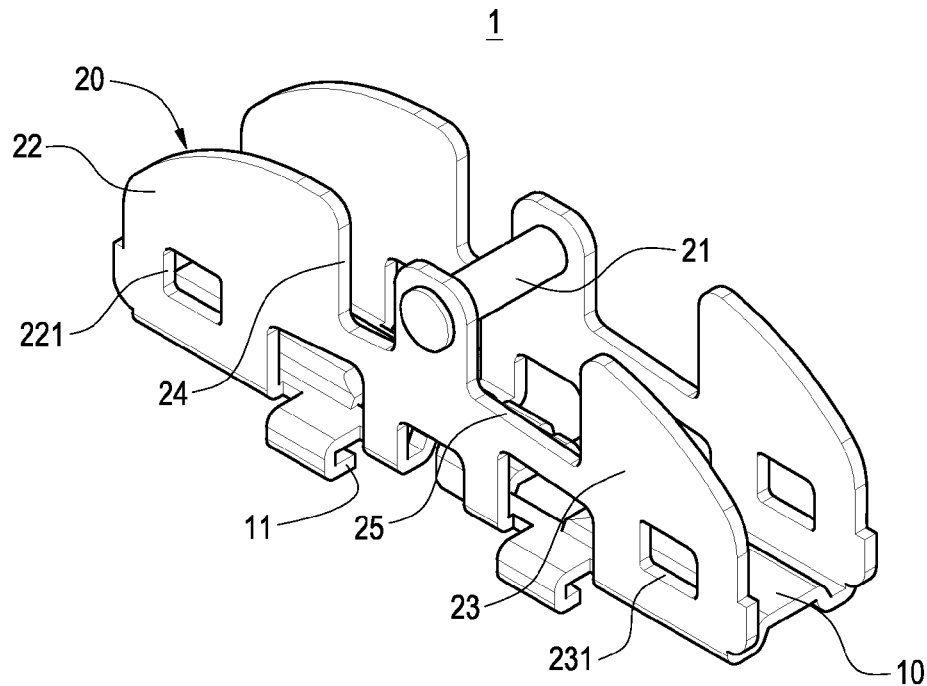
FIG. 1 is a perspective view showing the external appearance of the fixing base of the present invention.
Figure 2:
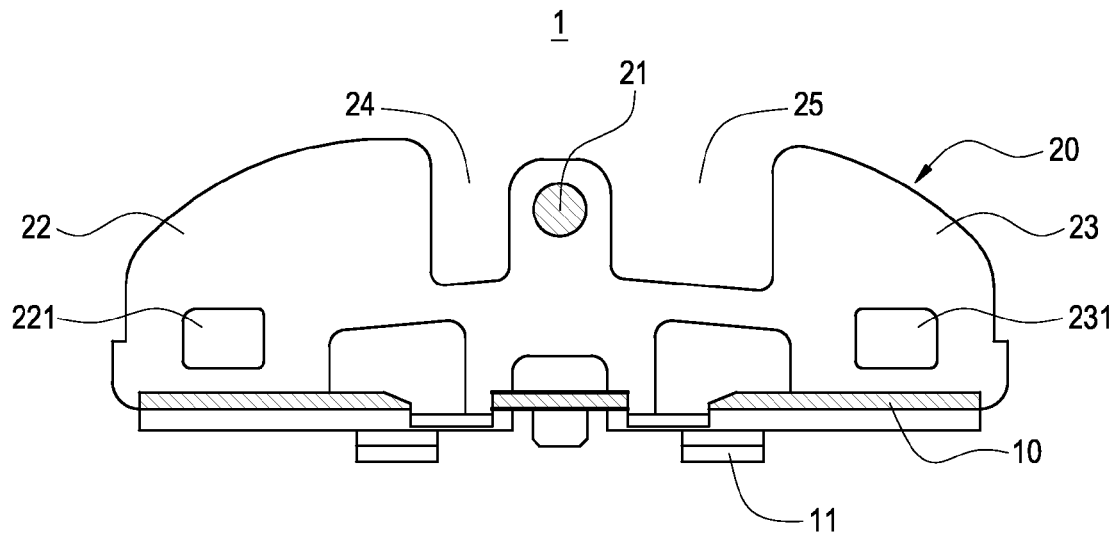
FIG. 2 is a side cross-sectional view showing the fixing base of the present invention.
Figure 3:
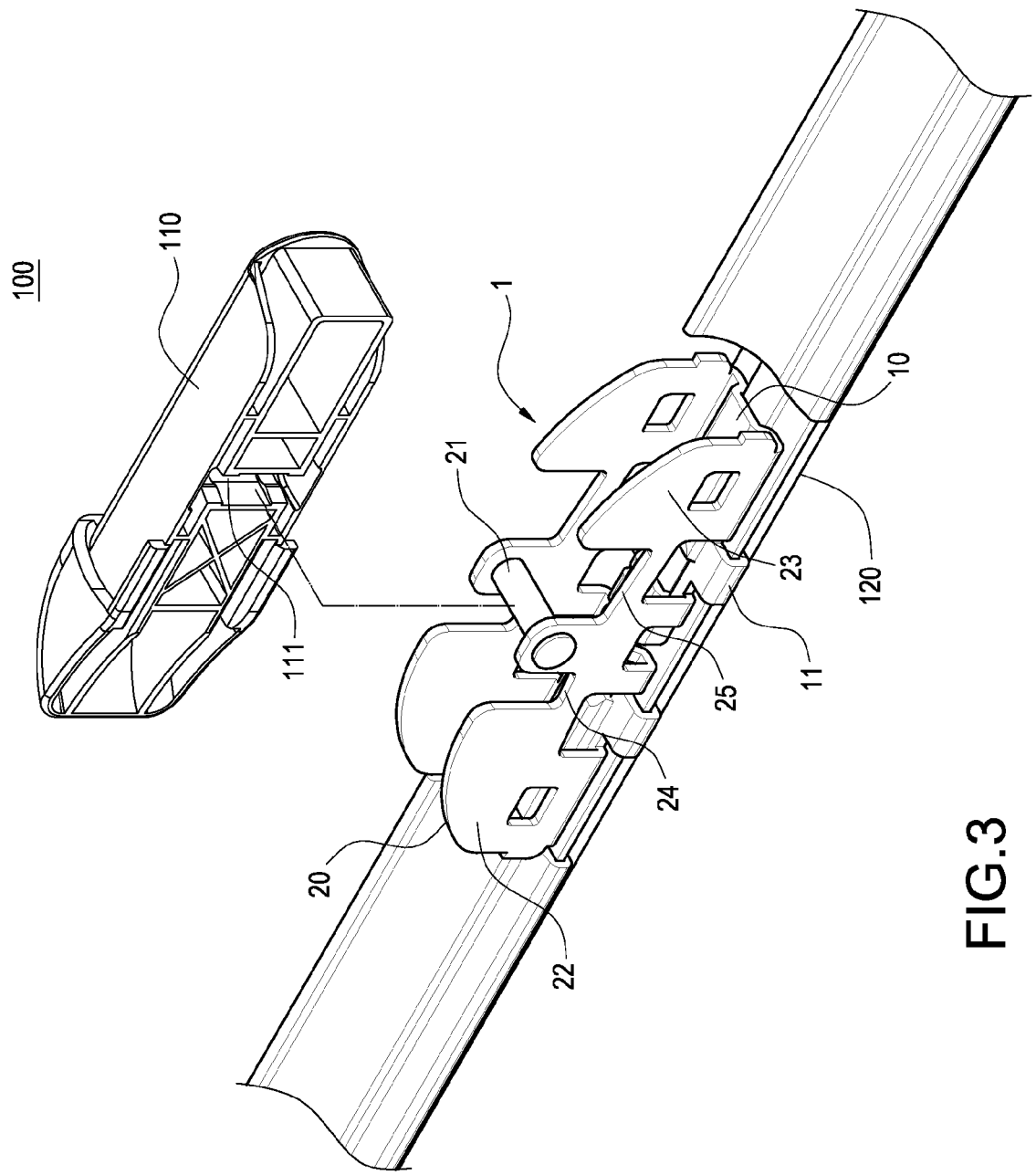
FIG. 3 is an exploded perspective view showing the fixing base of the present invention as well as a connecting piece and a wiper blade of a windshield wiper.

Please refer to FIGS. 1 to 5. The present invention relates to a fixing base 1 for a windshield wiper. As shown in FIG. 3, the windshield wiper 100 comprises a connecting piece 110 and a wiper blade 120. The connecting piece 110 is assembled with the fixing base 1, and the fixing base 1 is fixed to the top surface of the wiper blade 120, thereby forming the windshield wiper 1 shown in FIG. 4.

Please refer to FIG. 1. The fixing base 1 is made by a metallic material to form one unit. The fixing base 1 is constituted of a bottom plate 10 and two wings 20. Both longitudinal sides of the bottom plate 10 are bent to form two hooks 11 respectively. The hooks 11 are engaged with two side edges of the wiper blade 120 respectively.

Figure 4:
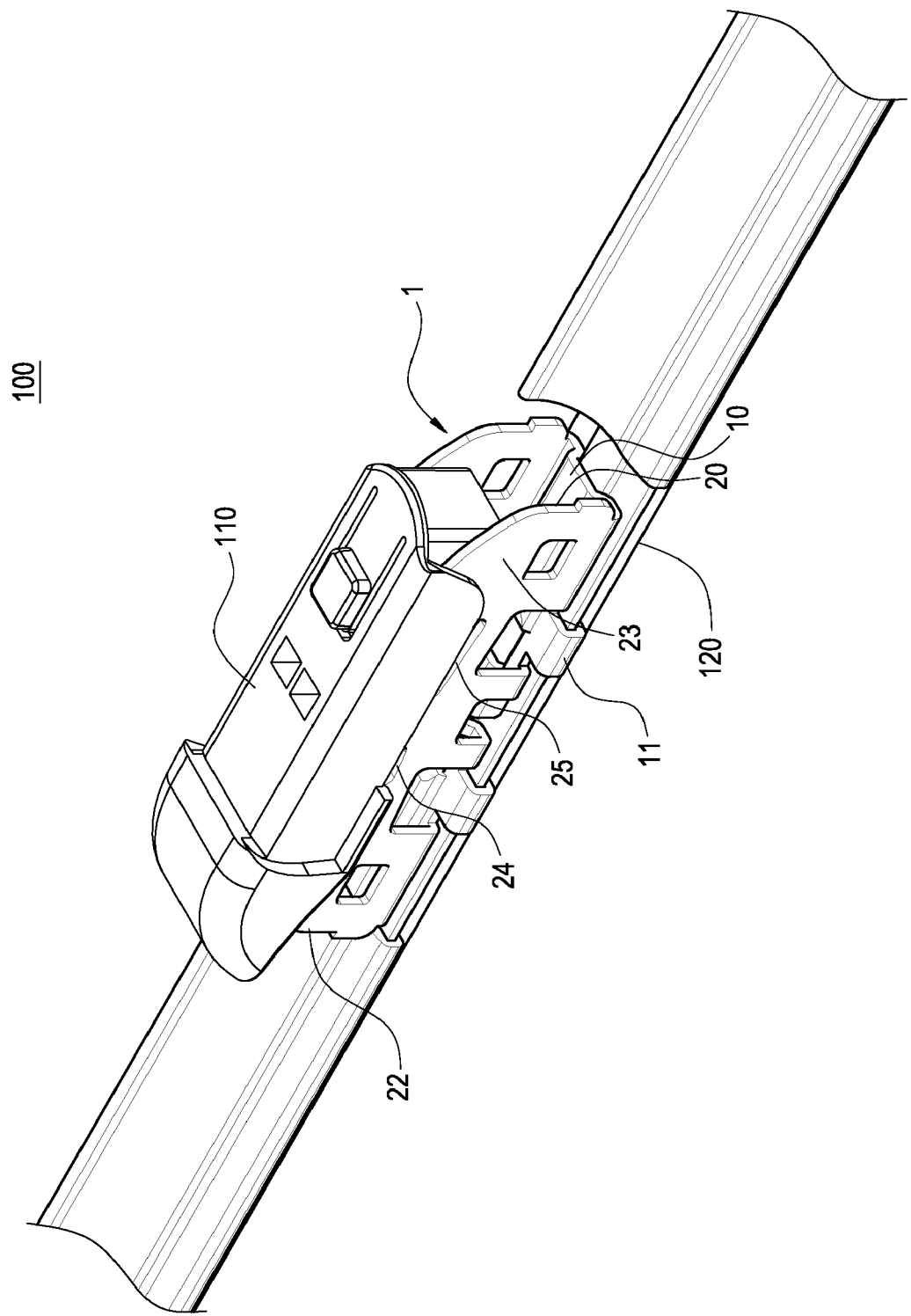
FIG. 4 is an assembled perspective view showing the fixing base of the present invention as well as the connecting piece and the wiper blade of the windshield wiper.

The two wings 20 extend upwards from both longitudinal sides of the bottom plate 10 and are separated from each other. A shaft rod 21 is provided between the two side wings 20 for allowing the connecting piece 110 to be pivotally connected thereto. More specifically, as shown in FIG. 4, a middle portion of the connecting piece 110 is provided with a notch 111 for allowing the shaft rod 21 to be pivotally inserted therein.

Each of the wings 20 is formed with a first chamfer piece 22 and a second chamfer piece 23. A first notch 24 is provided between the first chamfer 23 and the shaft rod 21. A second notch 25 is provided between the second chamfer piece 23 and the shaft rod 21. The shaft rod 21 is provided between the first notch 24 and the second notch 25.

As shown in FIG. 2, the first chamfer piece 22 and the second chamfer piece 23 are configured to gradually narrow toward both longitudinal ends of the fixing base 1. The first notch 24 and the second notch 25 provide a space adjacent to the shaft rod 21 to avoid mounting interference, thereby allowing various kinds of connecting pieces 110 to be assembled with the fixing base 1. It should be noted that, in the embodiment shown in FIG. 1, the area of the first notch 24 is smaller than that of the second notch 25. As a result, the area of the first chamfer piece 22 is larger than that of the second chamfer piece 23.

Further, the first chamfer piece 22 and the second chamfer piece 23 are provided with a hole 221 and 231 respectively. In the embodiment shown in FIG. 1, each of the holes 221 and 231 is substantially formed into a square hole. The hole 221 of the first chamfer piece 22 and the hole 231 of the second chamfer piece 23 are located in the same height with respect to the bottom plate 10.

Figure 5:
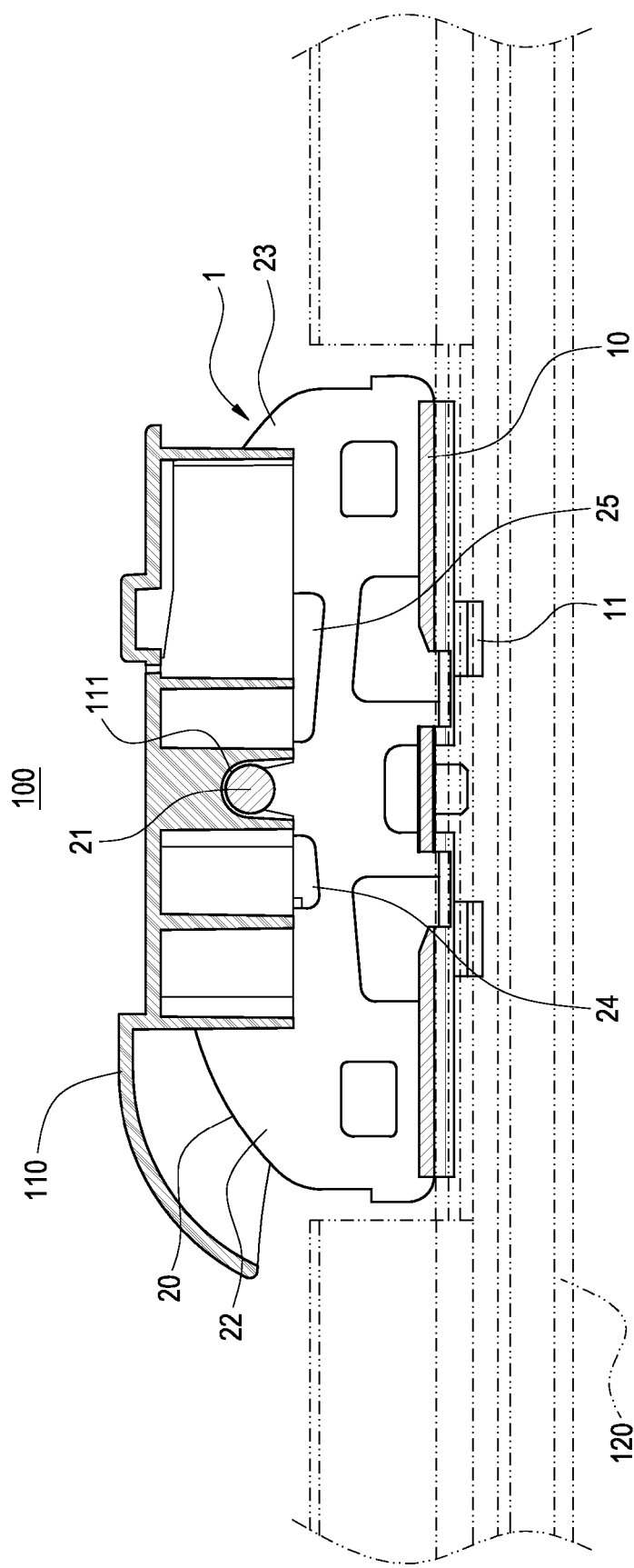
FIG. 5 is an assembled cross-sectional view showing the fixing base of the present invention as well as the connecting piece and the wiper blade of the windshield wiper.

Please refer to FIG. 5. It should be noted that, based on the experience and expert knowledge of the present Inventor in this field, the first chamfer piece 22 and the second chamfer piece 23 are configured to gradually narrow toward both longitudinal ends of the fixing base 1, so that the connecting piece 110 can swing around the shaft rod 21 and along the first chamfer piece 22 and the second chamfer piece 23 in the longitudinal direction of the fixing base 1. In this way, the range of swinging angle of the windshield wiper 100 is increased to fit various kinds of windshields (not shown). Further, the hole 221 of the first chamfer piece 22 and the hole 231 of the second chamfer piece 23 are designed to fit some specific connecting pieces (not shown). One end of such a specific connecting piece is provided with a hook or through-hole (not shown). The hook is engaged within the hole 221 of the first chamfer piece 22 or the hole 231 of the second chamfer piece 23. Alternatively, a pin (not shown) is disposed through the hole 221 or 231 and the through-hole of the specific connecting piece, thereby fixing the specific connecting piece to the fixing base 1.

Figure 6:
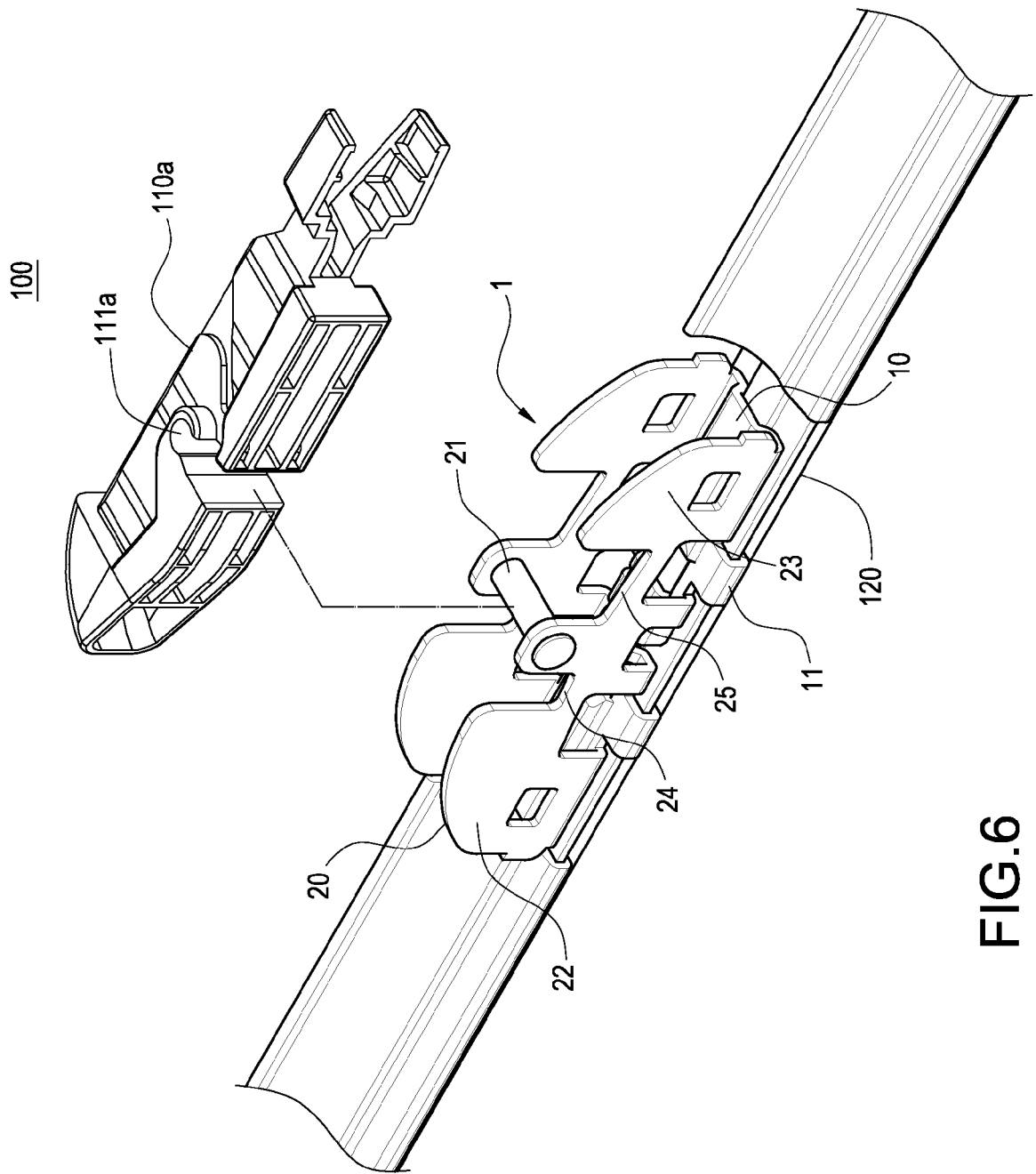
FIG. 6 is an exploded perspective view showing the fixing base of the present invention and a second kind of connecting piece.
Figure 7:
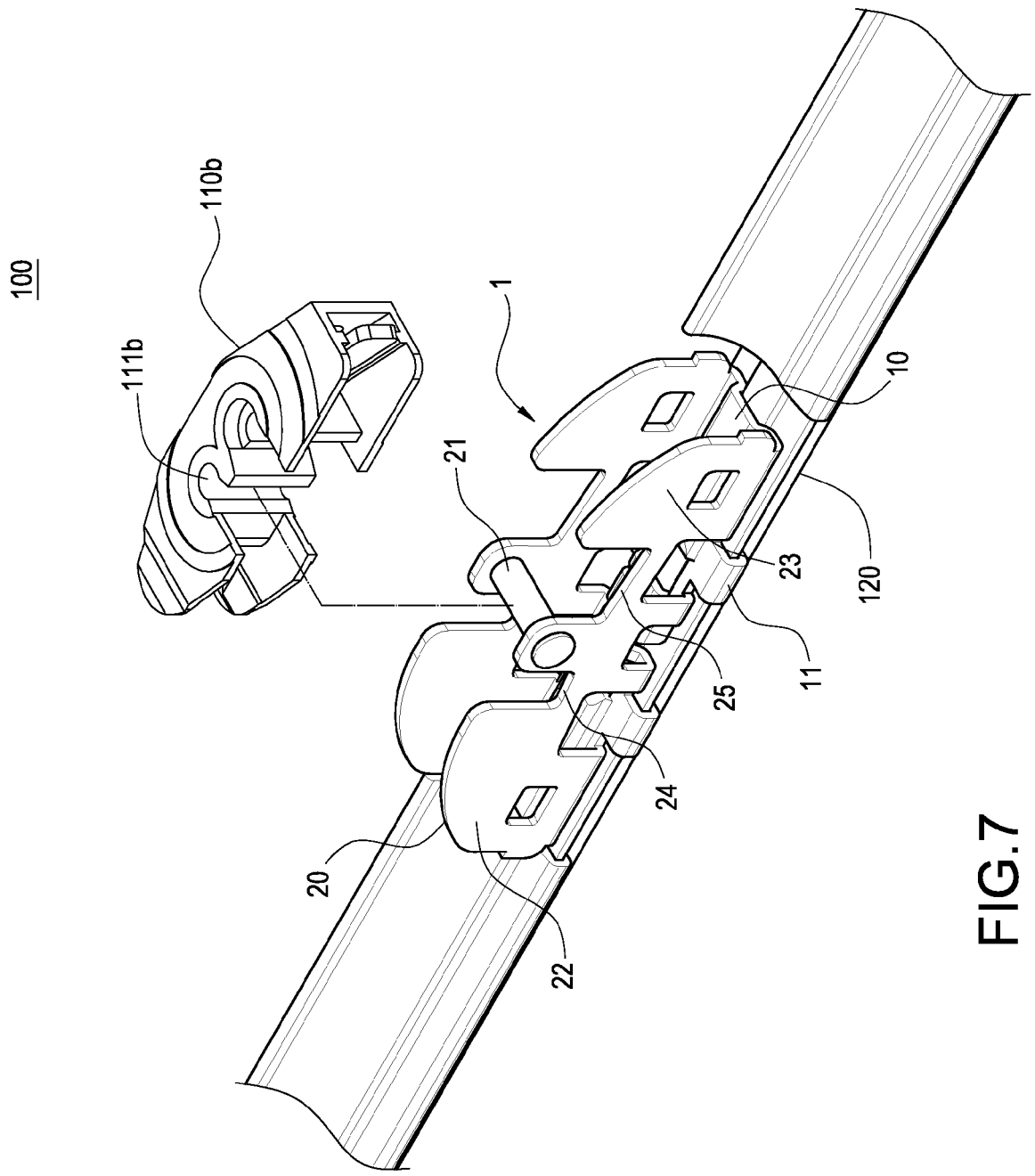
FIG. 7 is an exploded perspective view showing the fixing base of the present invention and a third kind of connecting piece.
Figure 8:
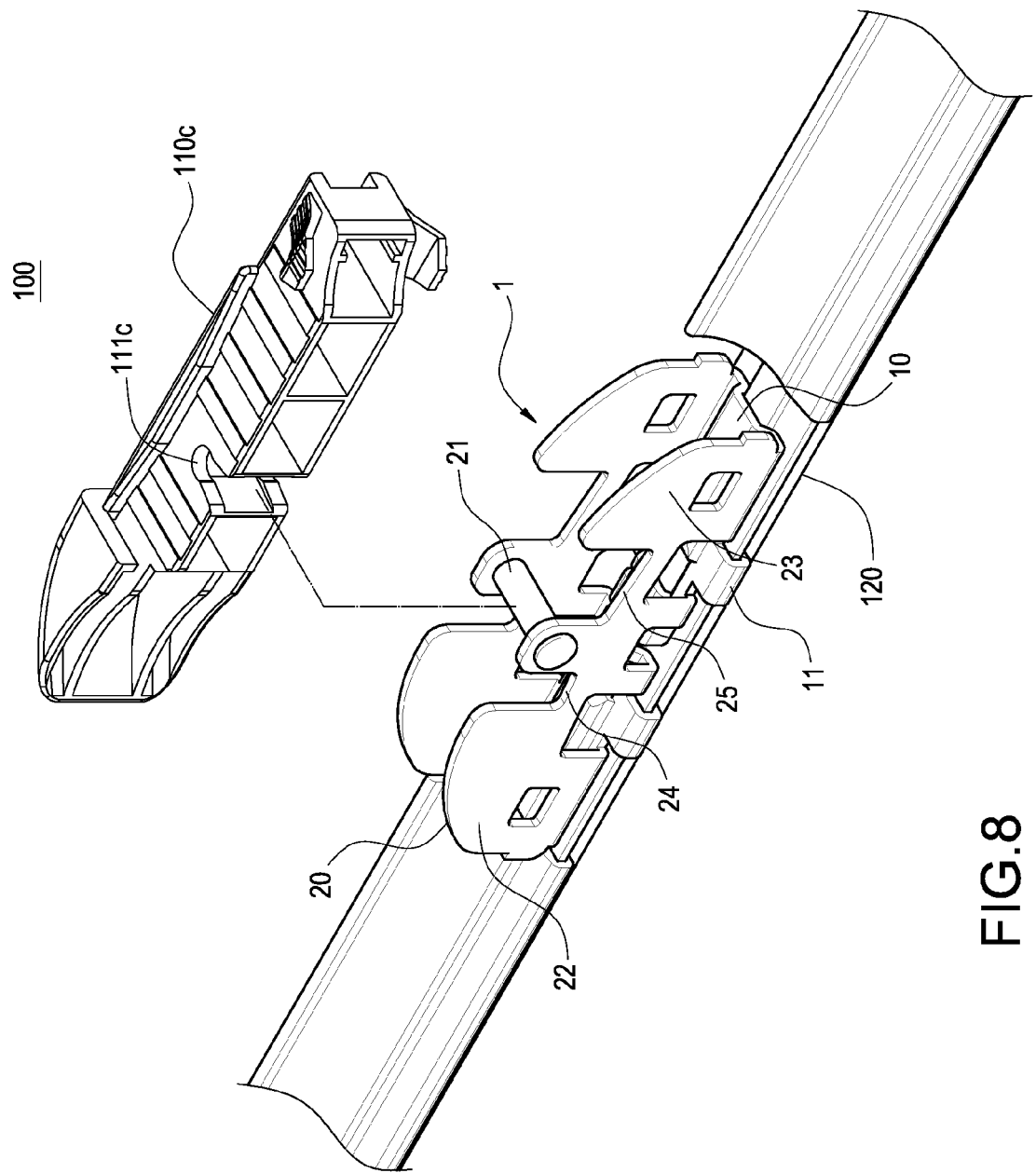
FIG. 8 is an exploded perspective view showing the fixing base of the present invention and a fourth kind of connecting piece.

Please refer to FIGS. 6 to 8, which show the assembly of the fixing base 1 of the present invention with other three kinds of connecting pieces 110a, 110b and 110c respectively. As shown in FIG. 6, a middle section of the connecting piece 110a is provided with a notch 111a. A user puts the connecting piece 110a under the fixing base 1 and presses the connecting piece 110a to thereby force the shaft rod 21 into the notch 111a. In this way, the connecting piece 110a is pivotally connected to the shaft rod 21. As shown in FIG. 7, a middle section of the connecting piece 110b is provided with a notch 111b. The user puts the connecting piece 110b under the fixing base 1 and presses the connecting piece 110b to thereby force the shaft rod 21 into the notch 111b. In this way, the connecting piece 110b is pivotally connected to the shaft rod 21. As shown in FIG. 8, a middle section of the connecting piece 110c is provided with a notch 111c. The user puts the connecting piece 110c under the fixing base 1 and presses the connecting piece 110c to thereby force the shaft rod 21 into the notch 111c. In this way, the connecting piece 110c is pivotally connected to the shaft rod 21.

As shown in FIGS. 6 to 8, the length, width and pitch of the bottom plate 10 and the two wings 20 are designed based on the dimensions of the current connecting pieces. The first chamfer 22 and the second chamfer piece 23 are configured to gradually narrow towards longitudinal ends of the fixing base 1. The first notch 24 and the second notch 25 provide a space adjacent to the shaft rod 21 to avoid mounting interference, so that various kinds of connecting pieces 110a, 110b and 110c can be assembled with the fixing base 1. Each of these different kinds of connecting pieces 110a, 110b and 110c can swing around the shaft rod 21 and along the first chamfer piece 22 and the second chamfer piece 23 in the longitudinal direction of the fixing base 1 without any interference.

Although the present invention has been described with reference to the foregoing preferred embodiments, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. An universal fixing base (1) for a windshield wiper (100), the windshield wiper (100) comprising a connecting piece (110) and a wiper blade (120) having an elongated protrusion formed on a top surface thereof, the fixing base (1) including:

a bottom plate (10) abutting the top surface of the wiper blade (120), having an elongated dent formed on a bottom surface thereof to engage with the elongated protrusion, both longitudinal sides of the bottom plate (10) being bent to form two hooks (11) respectively, the hooks (11) being engaged with two lateral edges of the wiper blade (120); and two wings (20) extending upwardly from two longitudinal sides of the bottom plate (10) and separated from each other, a shaft rod (21) being provided between the two wings (20) for allowing the connecting piece (110) to be pivotally connected thereto, each of the wings (20) being formed with a first chamfer piece (22) and a second chamfer piece (23), a first notch (24) being provided between the first chamfer piece (22) and the shaft rod (21), a second notch (25) being provided between the second chamfer piece (25) and the shaft rod (21), the shaft rod (21) being provided between the first notch (24) and the second notch (25), an opening being formed in the wings corresponding to each hook;

wherein each of the first chamfer pieces (22) and the second chamfer pieces (23) is provided with a hole (221, 231) beside the openings, respectively, to fit another connecting piece, and wherein the first chamfer piece (22) and the second chamfer piece (23) of each wing are configured to gradually narrow toward both longitudinal ends of the fixing base (1), the first notch (24) and the second notch (25) provide a space adjacent to the shaft rod (21) to avoid mounting interference of the connecting piece (110) for allowing various kinds of the connecting pieces (110) to be assembled with the universal fixing base (1).

2. The fixing base (1) for a windshield wiper (100) according to claim 1, wherein the fixing base (1) is made of a metallic material into one unit.

3. The fixing base (1) for a windshield wiper (100) according to claim 2, wherein on each wing an area of the first notch (24) is smaller than that of the second notch (25), and an area of the first chamfer piece (22) is larger that of the second chamfer piece (23).

4. The fixing base (1) for a windshield wiper (100) according to claim 1, wherein the hole (221) of each first chamfer piece (22) and the hole (231) of each second chamfer piece (23) are located in the same height with respect to the bottom plate (10).

* * * * *